Figure 1:
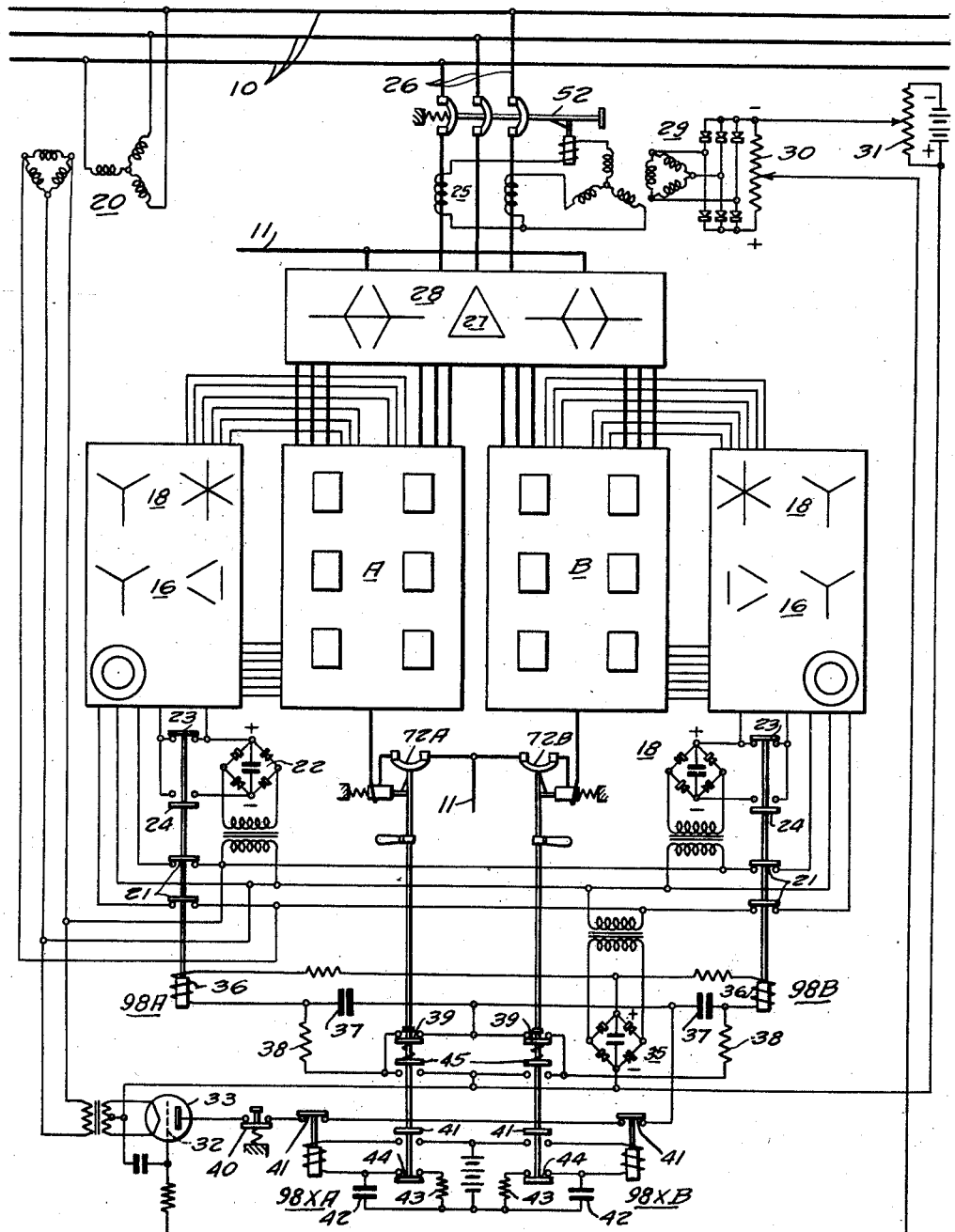

Patented Apr. 6, 1943

2,315,599

UNITED STATES PATENT OFFICE 2,315,599

VAPOR ELECTRIC SYSTEM

Joseph H. Cox, Forest Hills, and Louis A. Casanova, Wilkinsburg, Pa., assignors to Westinghouse Electric & Manufacturing Company, East Pittsburgh, Pa., a corporation of Pennsylvania Application December 24, 1941, Serial No. 424,302

6 Claims. (Cl. 175—363)

Our invention relates to a vapor electric converter, and particularly to a control system for a vapor electric converter of a make-alive type for blocking operation of the converter at high speed in response to fault in the converter.

In the application of vapor electric converters, particularly converters of the make-alive type, to loads requiring high concentration of power, it is customary to divide the power supply plant into a plurality of parallel operating converters and to utilize a single rectifier transformer for distributing energy to all of the converters, the cathode of the converters being connected on the direct-current bus to supply the load.

In the event of fault, such as arc-back in one of the converters or a short circuit on the load buses, it is necessary to block operation of all of the converters in order to clear the fault. Heretofore, this blocking has been performed in response to the operation of the reverse current breaker in the cathodes of the converters or by the opening of the cathode breaker in the faulty converter and main circuit breaker in the alternating current supply circuit.

According to our invention, we provide a control system responsive to the increase in current resulting from a fault to block the operation of the converter at high speed before the fault current becomes excessive. Because of the inductance in the circuits involved it requires an appreciable time (1 to 3 cycles) for the fault current to build up to its ultimate value. However, if the converters can be blocked at high speed, it is possible to prevent building up of the fault current and thus materially decrease the stresses on the transformer and other associated equipment as well as relieve the duty on the necessary operating breakers and thus prolong the useful life of the system.

In the system according to our invention, we utilize a controllable valve having control means responsive to the fault current for energizing a high speed relay which deenergizes the usual excitation and control system of the converter and maintains this blocking on all sections of the converter until the faulty section of the converter can be cleared by opening its series breaker, the opening of the series breaker of the faulty section being utilized to remove the blocking from all the non-faulty converter sections and returning them to service.

It is, therefore, an object of our invention to provide a control system operative at high speed to block the operation of the converter before the fault current can build up to objectionable value.

It is a further object of our invention to provide a control system which will block the action of a converter until the faulty section can be isolated.

A further object of our invention is to provide a control system for automatically eliminating a faulty section of a converter in response to fault therein.

Figure 2:
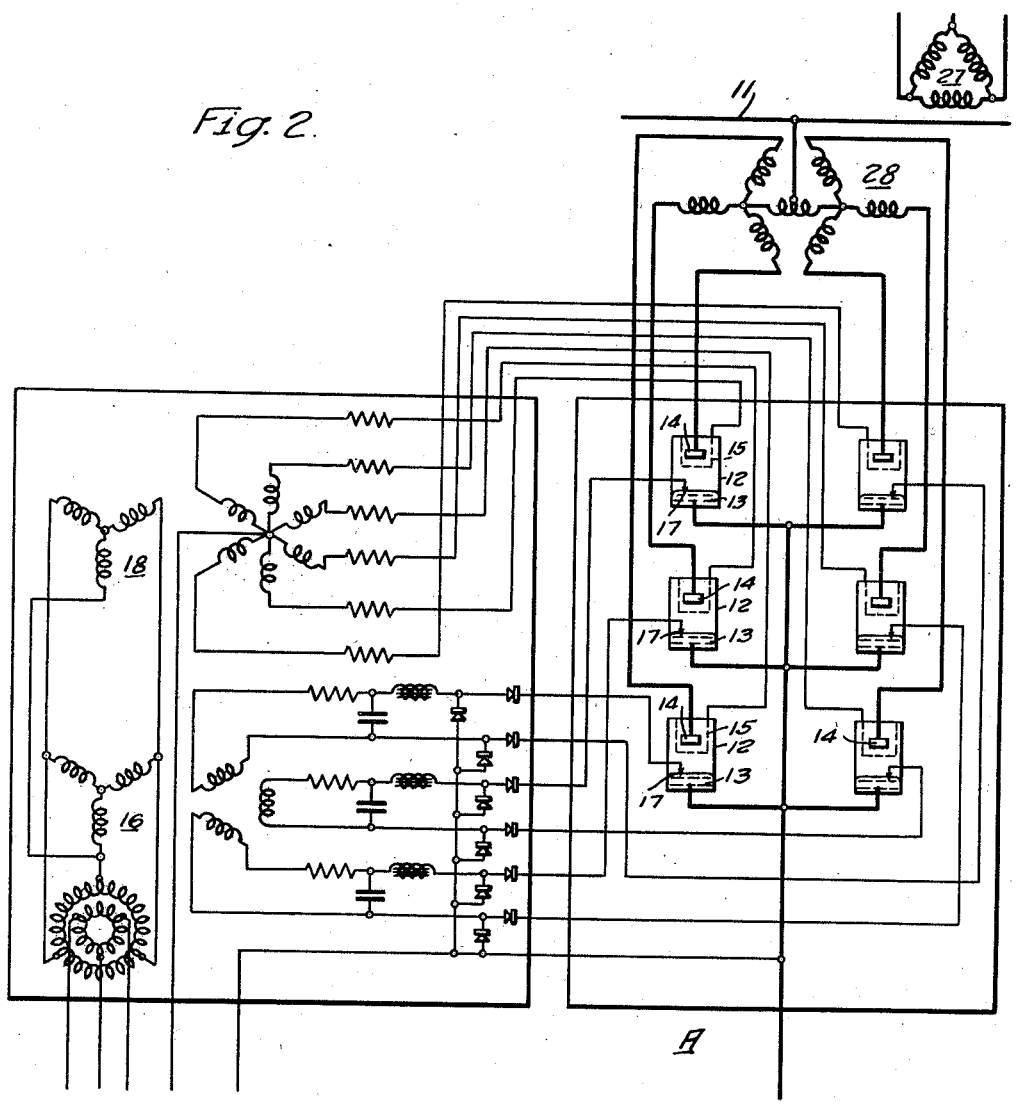

Other objects and advantages of our invention will be apparent from the following detailed description taken in conjunction with the accompanying drawings, in which:

Figure 1 is a schematic illustration of a conversion system according to our invention, certain connections being omitted for purpose of clearance, and Fig. 2 is an enlarged illustration of a single converter section showing the connections omitted from Fig. 1.

In the illustrative embodiment of our invention, a direct current circuit 11 is supplied with energy from an alternating current circuit 10 by means of a vapor-electric converter of the make-alive type in which a plurality of parallel converters or sections A and B are utilized to control the flow of current between the alternating current circuit 10 and the direct-current circuit 11; while a larger number of rectifier sections may be utilized, we have shown only two sections A and B for simplicity of illustration.

Each of the converter sections such as A and B are essentially complete and similar rectifier units comprising a plurality of electric valves 12 of the make-alive type. Each valve 12 comprises a suitable container adapted to be evacuated and enclosing a cathode 13 of vaporizable reconstructing material such as mercury or gallium, spaced from the cathode 13 is an anode 14 preferably having a working portion or head of a high temperature resistant material such as graphite while the anode is enclosed in a deionizing and arc directing shield 15 also preferably constructed of graphite. The construction of the valves is preferably such as shown in copending application Serial No. 409,503 assigned to the same assignee as the present application.

Each section of the converter has its individual control system including an impulsing circuit 16 to supply control impulses to the make-alive electrodes 17 of each of the valves 12, and a control transformer for supplying deionizing potential to an anode shield 19 in each of the valves 12.

While any suitable impulsing circuit may be utilized to supply control impulses to the make-alive electrode 17 we prefer to use the wave distorter network circuit disclosed in copending application Serial No. 404,888.

The control systems are energized from any suitable source of control potential having the same frequency as the potential of the alternating-current circuit 19, and in this instance, for simplicity, the source of potential is shown as a control transformer 20 energized from the alternating-current circuit 10.

The energization of the control systems of each of the converters A—B is effected through the front contacts 21 of individual high speed relays 98 for each of the rectifier sections A and B. A constantly energized source 22 of direct-current biasing potential is provided for each of the control transformers 18, and the connection of this source 22 is determined by front and back contacts 23—24 of the high speed relays 98A and 98B.

In order to secure initiating potential for our high speed system, we have provided a current transformer 25 associated with the alternating-current leads 26 between the alternating current system 10 and the primary 27 of the rectifier transformer 28 which distributes potential to the valves 12 of the rectifier sections A and B. The current transformer 25 provides a source of energy which is rectified by a full wave rectifier 29 and applied to a potentiometer 30 which is, in turn, connected in series with a constant biasing potential 31 for application to the grid 32 of a valve type relay 33 which is connected in series between a source of actuating potential herein illustrated as a full-wave rectifier 35, and the actuating coils 36 of the high speed relays 98A and 98B controlling the application of control potential to each of the control systems.

In order to secure a rapid application of current to the actuating coils 36 of the high speed relays 98A and 98B, a capacitor 37 is connected in series with each of the relay coils 36 of such a value that it will pass sufficient current to compel rapid closing of the relays 98A and 98B. However, since this current to produce rapid closing would, in general, be too great to maintain on the coil 36, we also provide the resistor 38 normally maintained in shunt with the capacitor 37 by means of a front contact 39 on the reverse current responsive cathode breakers 72A and 72B of each of the sections A and B, the resistor 38 being of such value as to pass sufficient current to maintain the relay in actuated position but preferably not sufficient current to actuate the relay or at least not sufficient current to produce the high speed action desired.

In order to release the high speed relays 98A and 98B after actuation in response to fault current, suitable relays 98XA and 98XB are provided for opening the anode current of the control valve 33, and in the event it is considered necessary, a manually operated switch 40 may be inserted in this anode circuit. Normally, the opening relays 98XA and 98XB are controlled by back contacts 41 on the fault responsive cathode breakers 72A and 72B, and each of the actuating coils 41 is provided with a capacitor 42 so that upon the closing of the back contacts 41, the opening relays will be energized momentarily to open the circuit and allow the tube 33 to regain control, thereby dropping out the high speed relays 98A or 98B not controlled because of the operation of the inverse current responsive breakers 72A or 72B. Preferably, suitable resistors 43 are provided and controlled by means of a front contact 44 on the reverse current responsive breaker 72 for discharging the capacitors 42 in series with the opening relays 98X.

In the operation of the conversion system, according to our invention, the various converters operating in parallel are energized by closing of the breaker 52 supplying potential from the alternating-current circuit 10 to the rectifier transformer 28, the circuit to the direct-current circuit 11 being made by means of the fault responsive breakers 72A and 72B.

In the event of fault, such as short circuit on the load system or arc-back in any of the converters A or B, the current transformer 25 will produce a potential which will be rectified and applied to the potentiometer 30 for overcoming the constant bias 31 and applying a positive impulse to the grid 32 of the valve type relay 33. This relay 33 then passes current which simultaneously picks up all of the high speed relays 98 through the series connected capacitors 37, thereby deenergizing the impulsing transformer 16 and the shield transformer 18 of all of the converter sections. After the picking up of the relays 98 through the capacitors 37, they will be held in operated position by means of the current passing through the resistors 38 normally in shunt with the pick-up capacitors 37. The opening of the 98 relays not only interrupts the normal controlling impulses, but renders effective a negative bias from source 22 through the shield transformers 18 to all of the shields 15 so as to deionize the space about the anodes 14 and prevent any anode 14 not then carrying current from picking up current during the fault period. After the high speed blocking of all the valves by the relays 98, the reverse current responsive breaker 72 in the cathode of the faulty section will open because of the reverse current if the fault was in the nature of an arc back, and when it opens its back contact 45 will pick up the associated high speed relay 98 and connect it directly across the source of control potential 35, at the same time another back contact 41 will energize the 98X relay opening the potential circuit to the control tube 33 and allowing all of the high speed relays 98 other than the one controlled by the back contact 45 of the reverse current breaker 72 in the faulty section to fall out, thus removing biasing potential of source 22 from the shield transformers 18 and reenergizing the shield transformers 18 and impulsing transformers 16 of each of the non-faulty sections. The rectifier then will pick up and carry load without the faulty section which may be returned to service either automatically or manually as may be desired. However if the fault was of the nature of a short on the load circuit the reverse current breaker 72 will not open, except in the event of excessive current which is normally prevented by the high speed control, in which event the relays 98 are deenergized by operation of the switch 40. Obviously the switch 40 may be manually controlled or actuated in any desired manner such as remote control or by a timer control.

While for the purpose of illustration we have shown and described a specific embodiment of our invention it will be apparent to those skilled in the art that many changes and modifications can be made therein without departing from the true spirit of our invention or the scope of the appended claims.

We claim as our invention:

1. In combination, a polyphase alternating current circuit, a direct current circuit, a plurality of parallel operating converters interconnecting said circuits, each of said converters including a plurality of vapor electric valves of the make-alive type, each valve having an anode, a vaporizable cathode, a make-alike electrode and a shield about the anode, a control system for each converter, each of said control systems including an impulsing means for supplying control impulses to the make-alive electrodes and a potential transformer for supplying potential to the anode shields of the valves, a source of polyphase control potential, a high speed relay for each of said control systems, means including contacts on said high speed relays for connecting the source to the several control systems, a source of direct current actuating potential for said high speed relays, a valve type relay for supplying current from said source to said high speed relays and means including a current transformer responsive to the abnormal flow of current between said converter and said alternating current circuit for controlling said valve type relay to energize said high speed relays to deenergize said control systems, a source of direct current biasing potential, a second set of contacts on said high speed relays, said second set of contacts operable to connect said source of biasing potential to the anode shields.

2. In combination, a polyphase alternating current circuit, a direct current circuit, a plurality of parallel operating rectifiers interconnecting said circuits, each of said rectifiers including a plurality of vapor electric valves of the make-alike type, each valve having an anode, a vaporizable cathode, a make-alive electrode and a shield about the anode, a control system for each rectifier, each of said control systems including an impulsing means for supplying control impulses to the make-alive valves and a potential transformer for supplying potential to the anode shields of the valves, a source of polyphase control potential, a high speed relay for each of said control systems, means including contacts on said high speed relays for connecting the source to the several control systems, a source of direct current actuating potential for said high speed relays, a valve type relay for supplying current from said source to said high speed relays and means including a current transformer responsive to the flow of current between said converter and said alternating current circuit for controlling said valve type relay to energize said high speed relays to deenergize said control systems, a source of direct current biasing potential, a second set of contacts on said high speed relays, said second set of contacts operable to connect said source of biasing potential to the anode shields, a fault responsive circuit breaker in series with each of said converters, auxiliary contacts on each of said circuit breakers, said auxiliary contacts operating in response to fault to connect the associated high speed relay across said source of direct current actuating potential, a second auxiliary contact on said fault responsive circuit breaker and relay means energized by operation of said second auxiliary contact to deenergize said valve type relay.

3. An electric current translating system for transferring energy between an alternating current circuit and a direct current circuit comprising a plurality of parallel operating vapor-electric converters each converter including a plurality of vapor-electric valves of the make-alive type, a control system for each converter, each control system including an impulsing circuit and a shield energizing circuit, a source of control potential, connections for impressing the potential of said source on each of said control systems, a high speed relay for each of said control systems, contacts on said relays for controlling the energization of said system, a fault responsive breaker for each of said converters, means for energizing said high speed relays including a capacitor and a resistor, a valve type relay for energizing said relays through said capacitors and said resistors and fault responsive means for actuating said valve type relay.

4. An electric current translating system for transferring energy between an alternating current circuit and a direct current circuit comprising a plurality of parallel operating vapor-electric converters each converter including a plurality of vapor-electric valves of the make-alive type, a control system for each converter, each control system including an impulsing circuit and a shield energizing circuit, a source of control potential, connections for impressing the potential of said source on each of said control systems, a high speed relay for each of said control systems, contacts on said relays for controlling the energization of said systems, a fault responsive breaker for each of said converters, means for energizing said high speed relays including a capacitor and a resistor, a valve type relay for energizing said relays through said capacitors and said resistors and fault responsive means for actuating said valve type relay, an auxiliary contact on each of said fault responsive breakers for energizing the high speed relay of the faulty rectifier through the resistor and a second auxiliary contact for deenergizing the valve type relay.

5. An electric current translating system for transferring energy between an alternating current circuit and a direct current circuit comprising a plurality of parallel operating vapor-electric converters each converter including a plurality of vapor-electric valves of the make-alive type, a control system for each converter, each control system including an impulsing circuit and a shield energizing circuit, a source of control potential, connections for impressing the potential of said source on each of said control systems, a high speed relay for each of said control systems, contacts on said relays for controlling the energization of said systems, a fault responsive breaker for each of said converters, means for energizing said high speed relays including a capacitor and a resistor, a valve type relay for energizing said relays through said capacitors and said resistors and fault responsive means for actuating said valve type relay, an auxiliary contact on each of said fault responsive breakers for energizing the high speed relay of the faulty rectifier through the resistor and a second auxiliary contact for deenergizing the valve type relay, a source of direct current potential for each of said conversion and means actuated by said high speed relays for impressing the potential of said direct current source on the shields of the valves of the respecting converters.

6. An electric translating system interconnecting an alternating current supply circuit and a direct current load circuit comprising a plurality of parallel operating vapor electric rectifiers, a reverse current breaker for each of said parallel rectifiers, unitary transformer means for connecting said rectifiers to the alternating current circuit, a control system for each of said rectifiers, a high speed relay for controlling the energization of each of said control systems, a fault responsive relay for energizing said high speed relays for deenergizing said control systems, means carried by said reverse current relays operable on opening of said breaker to energize the high speed relay associated with the same rectifier and means carried by said reverse current breakers operable on opening the breaker to deenergize said fault responsive relay.

JOSEPH H. COX.
LOUIS A. CASANOVA.